Figure 1:
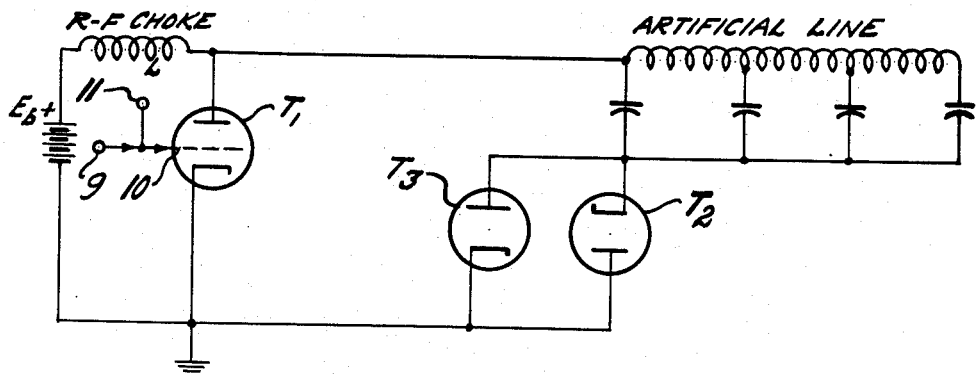

June 25, 1963  P. A. BRYAN  3,095,557

SYSTEM FOR LOCATING MODULATOR MALFUNCTION

Filed Oct. 4, 1960

INVENTOR.
PAUL A. BRYAN
BY
ATTORNEYS

United States Patent Office 3,095,557
Patented June 25, 1963

3,095,557
SYSTEM FOR LOCATING MODULATOR
MALFUNCTION
Paul A. Bryan, Rome, N.Y., assignor to the United States of America as represented by the Secretary of the Air Force
Filed Oct. 4, 1960, Ser. No. 60,530
2 Claims. (Cl. 340—248)
(Granted under Title 35, U.S. Code (1952), sec. 266)

The invention described herein may be manufactured and used by or for the United States Government for governmental purposes without payment to me of any royalty thereon.

The present invention relates to radar modulators and more particularly to apparatus to indicate the malfunctioning of a thyratron switch tube utilized in aforesaid radar modulators.

In the prior art, thyratron electron discharge devices have been utilized for switching in radar modulators of the line-pulsing type. The thyratron serving as a switch is fired by a trigger pulse applied to the grid electrode thereof as shown and described at pages 355–390, volume 1, of Radiation Laboratory Series, published in 1947 by McGraw-Hill Company, Inc. However, the thyratrons, such as the hydrogen type, are subject to arc-through caused by high current flow. In the past the aforementioned arc-through has been detected by placing additional circuitry such as current transformers or current viewing resistors in the main current switching circuit which has extremely high currents.

The present invention provides novel apparatus which indicates the occurrence of arc-through in a thyratron utilized for switching wherein the aforesaid apparatus is excluded from the high current paths thereby providing indicating means which is less subject to failure and also which has greater reliability and life expectancy.

An object of the present invention is to provide indicating means which is excluded from the high current paths of a modulator and which indicate malfunctioning of the thyratron incorporated in aforesaid modulator.

Another object of the present invention is to provide a thyratron arc-through indicator.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
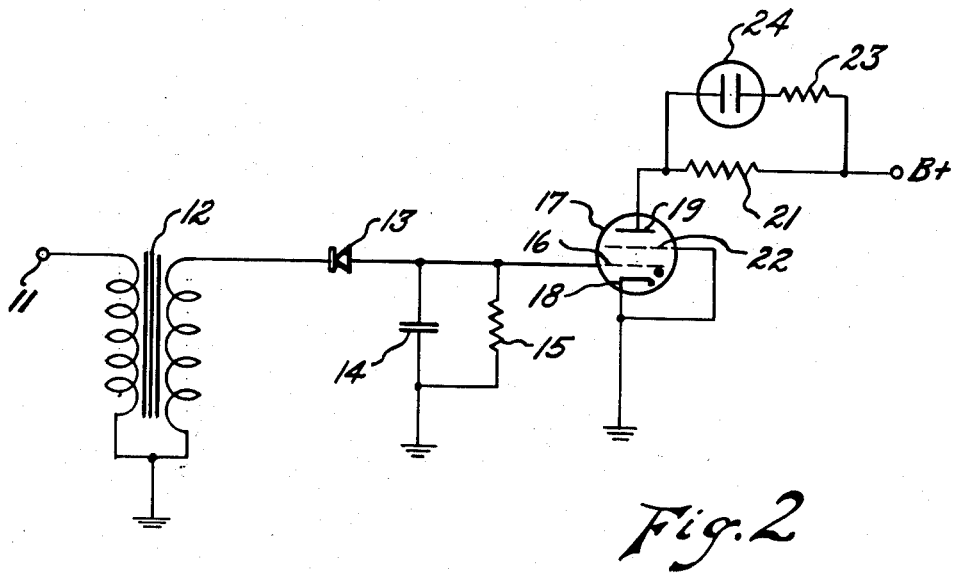

In the drawings:

FIGURE 1 is a schematic diagram of a line pulse modulator incorporating a thyratron switching tube; and FIGURE 2 is a schematic diagram of the thyratron arc-through indicator.

Now referring to FIGURE 1, there is shown a conventional radar modulator of the direct-coupled line pulse type, the modulator incorporating a thyratron as a switch device. The conventional modulator of FIGURE 1 is shown and described at pages 1020–1022 of Electronic and Radio Engineering by Terman and published in 1955 by McGraw-Hill Company, Inc. Grid of thyratron $T_1$ receives positive pulses from its associated radar system and the aforesaid positive pulses fires thyratron $T_1$ and thus causes it to conduct. In effect the positive trigger effectively turns on the thyratron switch and thus permits current to flow.

Now referring to FIGURE 2, there is shown a schematic diagram of the apparatus utilized to indicate arc-through occurring in thyratron $T_1$ of FIGURE 1. Cathode 18 of electron discharge device 17 is connected to ground. Anode 19 is connected to a positive source of voltage by way of resistor 21. Grid 16 is connected to ground by way of resistor 15. Across resistor 15 is connected capacitor 14. Grid 22 is connected to ground. Resistor 23 is in series with neon tube 24 and the series combination is connected across resistor 21. Electron discharge device 17 may be of the 2D21 relay tube type. Resistor 21 serves to limit the plate current in electron discharge device 17.

Electron discharge device 17 is initially adjusted without a signal input thereto so that current will flow therein. As a result of the aforesaid current flow, neon tube 24 will be actuated and thereby be illuminated.

During the operation of the modulator shown in FIGURE 1, positive pulses applied by way of terminal 9 to grid 10 of thyratron $T_1$ of FIGURE 1, are also applied to terminal 11 of FIGURE 2. The positive pulses are inverted by blocking oscillator transformer 12. The inverted pulses are fed through diode 13 and negatively charge capacitor 14. The combination of capacitor 14 and resistor 15 is selected to provide an average bias level at grid 16 of electron discharge device 17 sufficient to prevent conduction at the anode voltage used and at normal operating conditions. Therefore, during the course of operation of aforesaid modulator, positive pulses are applied to terminal 11, electron discharge device 17 becomes non-conductive and as a result thereof neon tube 24 is not illuminated. When arc-through occurs in thyratron $T_1$ of FIGURE 1, the positive pulses being applied thereto are shorted to ground and as a consequence thereof, the pulses are no longer applied to terminal 11 of FIGURE 2. The negative bias level supplied by the combination of capacitor 14 and resistor 15 is no longer of sufficient magnitude to bias electron discharge tube 17 to cut-off and electron discharge device 17 conducts. Neon tube 24 becomes illuminated and thereby indicates that arc-through is occurring. Thus, there is provided a simple apparatus to indicate arc-through of a thyratron utilized as a switching device in a radar modulator. The apparatus is excluded from the main high current paths of the modulator but nevertheless insures a simple reliable indicator for malfunctioning of aforementioned modulator.

While in accordance with the provisions of the statutes, I have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. An apparatus to indicate the malfunctioning of a thyratron switch tube incorporated in a modulator, the grid electrode of said switch tube receiving directly thereat actuating positive pulses, said positive pulses being short-circuited to ground upon said malfunctioning, a transformer having primary and secondary windings, one leg of said primary winding directly connected to said grid electrode of said thyratron switch tube and one leg of said secondary winding delivering a negative pulse for each positive pulse received at said primary winding, an electron discharge device having control grid, cathode and anode electrodes, said electron discharge device being normally conductive, a diode connected between said leg of said secondary winding and said control grid of said electron discharge device, said diode being arranged to pass only negative pulses, a capacitor and a first fixed resistor in parallel combination connected between said control grid electrode of said electron discharge device and ground, said combination being selected to provide an average bias level at said control grid of said electron discharge device sufficient to prevent conduction therein upon the receipt of negative pulses by said combination, and an illuminating circuit consisting of a neon tube in series with a second resistor, said series combination being connected between a positive source of voltage and said anode electrode of said electron discharge device, a third resistor in parallel circuit with said series combination, said illuminating circuit operating to illuminate said neon tube upon the occurrence of conduction within said electron discharge device.

2. An apparatus to indicate the malfunctioning of a thyratron switch tube incorporated in a modulator, the grid of said switch tube directly receiving actuating positive pulses, said positive pulses being short-circuited to ground by said malfunctioning, a transformer having a primary winding and a secondary winding, one leg of said primary winding being connected to said grid of said switch tube and one leg of said secondary winding delivering a negative pulse for each positive pulse received at said primary winding, a diode receiving said negative pulses directly from said secondary winding, said diode being arranged to only pass negative pulses, an electron discharge device having a grid, cathode and anode electrode, said device being normally conductive, a capacitor and a fixed resistor connected in parallel combination, said combination receiving directly said passed negative pulses from said diode and operating to provide an average bias level at said grid electrode of said electron discharge device sufficient to prevent conduction therein upon receipt of said negative pulses, said electron discharge device conducting upon said short-circuiting of said positive pulses, and a neon tube connected in the anode circuit of said electron discharge device, said neon tube being illuminated upon conduction within said electron discharge device.

References Cited in the file of this patent
UNITED STATES PATENTS
2,854,663   Maynard _____ Sept. 30, 1958